(12) United States Patent
Hotchkiss et al.

(10) Patent No.: US 9,720,500 B2
(45) Date of Patent: Aug. 1, 2017

(54) HAPTIC TOUCH PANEL ASSEMBLY FOR A VEHICLE

(71) Applicant: Faurecia Interior Systems, Inc., Auburn Hills, MI (US)

(72) Inventors: Jay W. Hotchkiss, Rochester Hills, MI (US); Daniel R. Vander Sluis, Rochester Hills, MI (US)

(73) Assignee: Faurecia Interior Systems, Inc, Auburn Hills, MI (US)

( * ) Notice: Subject to any disclaimer, the term of this patent is extended or adjusted under 35 U.S.C. 154(b) by 61 days.

(21) Appl. No.: 14/536,039

(22) Filed: Nov. 7, 2014

(65) Prior Publication Data

US 2016/0132113 A1     May 12, 2016

(51) Int. Cl.

| | | |
|---|---|---|
| *G06F 3/01* | (2006.01) | |
| *B60K 37/06* | (2006.01) | |
| *G06F 3/041* | (2006.01) | |
| *G06F 3/0488* | (2013.01) | |
| *B60R 11/00* | (2006.01) | |

(52) U.S. Cl.
CPC .............. *G06F 3/016* (2013.01); *B60K 37/06* (2013.01); *G06F 3/041* (2013.01); *G06F 3/0488* (2013.01); *B60K 2350/104* (2013.01); *B60K 2350/1056* (2013.01); *B60R 2011/008* (2013.01); *B60R 2011/0084* (2013.01); *B60R 2011/0085* (2013.01); *G06F 2203/014* (2013.01); *G06F 2203/04103* (2013.01); *G09G 2380/10* (2013.01)

(58) Field of Classification Search
None
See application file for complete search history.

(56) References Cited

U.S. PATENT DOCUMENTS

| | | |
|---|---|---|
| 5,889,672 A | 3/1999 | Schuler et al. |
| 6,275,213 B1 | 8/2001 | Tremblay et al. |
| 6,424,333 B1 | 7/2002 | Tremblay et al. |
| 6,429,846 B2 | 8/2002 | Rosenberg et al. |
| 7,592,999 B2 | 9/2009 | Rosenberg et al. |
| 7,969,288 B2 | 6/2011 | Braun et al. |

(Continued)

FOREIGN PATENT DOCUMENTS

| | | |
|---|---|---|
| CN | 101359264 A | 2/2009 |
| DE | 102008051155 A1 | 4/2010 |

(Continued)

OTHER PUBLICATIONS

Extended European Search Report corresponding to EP application No. 15193564, dated Mar. 15, 2016, 12 pages.

(Continued)

*Primary Examiner* — Seokyun Moon
(74) *Attorney, Agent, or Firm* — Reising Ethington P.C.

(57) ABSTRACT

A haptic touch panel assembly for a vehicle. The haptic touch panel assembly includes a haptic touch panel, a support substrate, and a suspension component to couple the haptic touch panel to the support substrate. More accurate and dynamic haptic feedback for various vehicle interior components may be provided through the use of a suspension component that allows for three or more degrees of freedom movement or two or more haptic actuators that facilitate movement in two or more different directions.

20 Claims, 5 Drawing Sheets

(56) References Cited

U.S. PATENT DOCUMENTS

| | | | |
|---|---|---|---|
| 7,982,720 B2 | 7/2011 | Rosenberg et al. | |
| 7,999,660 B2 | 8/2011 | Cybart et al. | |
| 8,031,181 B2 | 10/2011 | Rosenberg et al. | |
| 8,059,105 B2 * | 11/2011 | Rosenberg | A63F 13/06 178/18.01 |
| 8,144,453 B2 | 3/2012 | Brown et al. | |
| 8,531,407 B2 * | 9/2013 | Tanaka | H01H 13/83 178/18.01 |
| 8,629,954 B2 | 1/2014 | Olien et al. | |
| 8,780,543 B2 | 7/2014 | Mölne et al. | |
| 2005/0225539 A1 | 10/2005 | Prados | |
| 2006/0071901 A1 | 4/2006 | Feldman | |
| 2006/0256075 A1 | 11/2006 | Anastas et al. | |
| 2007/0057927 A1 | 3/2007 | Prados | |
| 2007/0236474 A1 * | 10/2007 | Ramstein | G06F 3/016 345/173 |
| 2008/0143559 A1 | 6/2008 | Dietz et al. | |
| 2010/0060437 A1 | 3/2010 | Steckel et al. | |
| 2010/0238053 A1 | 9/2010 | Schmidt et al. | |
| 2011/0242014 A1 | 10/2011 | Tsai et al. | |
| 2012/0038568 A1 | 2/2012 | Colloms et al. | |
| 2012/0038577 A1 | 2/2012 | Brown et al. | |
| 2012/0120010 A1 | 5/2012 | Yu et al. | |
| 2012/0200789 A1 | 8/2012 | Mölne et al. | |
| 2012/0286847 A1 | 11/2012 | Peshkin et al. | |
| 2012/0326999 A1 | 12/2012 | Colgate et al. | |
| 2013/0100046 A1 * | 4/2013 | Chuang | G06F 3/016 345/173 |
| 2013/0314867 A1 | 11/2013 | Liu | |
| 2014/0139452 A1 | 5/2014 | Levesque et al. | |
| 2014/0176462 A1 | 6/2014 | Ponziani | |
| 2015/0145783 A1 * | 5/2015 | Redelsheimer | G06F 3/016 345/173 |
| 2016/0132112 A1 | 5/2016 | Vander Sluis et al. | |

FOREIGN PATENT DOCUMENTS

| | | |
|---|---|---|
| JP | H04129115 A | 4/1992 |
| WO | WO2013068651 A2 | 5/2013 |
| WO | WO2013160560 A9 | 10/2013 |

OTHER PUBLICATIONS

Extended European Search Report corresponding to EP application No. 15193563.2, dated Feb. 12, 2016, 9 pages.

* cited by examiner

HAPTIC TOUCH PANEL ASSEMBLY FOR A VEHICLE

TECHNICAL FIELD

The present disclosure relates generally to haptic touch panel assemblies and, more particularly, to haptic touch panel assemblies used in vehicle interiors.

BACKGROUND

The proliferation of touch panel assemblies, such as those that incorporate a graphical user interface in lieu of devices that employ traditional push button assemblies and/or other assemblies that require more manual user input, has coincided with a need to provide the user with haptic feedback. Haptic feedback may include vibration or other movement that can be detected by as user's sense of touch. The haptic feedback provided by touch panel assemblies can enhance the user's experience by confirming activation of a certain command or providing sensations that better coincide to images on a graphical user interface display, for example. Such feedback may be particularly beneficial for vehicular applications so that drivers can haptically sense that their input is received while remaining focused on the road. Combinations of actuators and suspension components may be used to facilitate relative movement of touch panel assembly components.

Conventional haptic feedback in vehicular applications, however, only actuates movement in one degree of freedom, which limits the feedback to simple movement in one direction so that all feedback sensations feel the same to the driver, passenger, or other user. For instance, U.S. Patent Application Publication No. 2010/0060437 by Steckel et al. discloses a haptic operating control for use in a vehicle. The operating control described by Steckel uses an oscillator coil that vibrates in a single direction normal to the touch surface.

SUMMARY

In accordance with one embodiment, a haptic touch panel assembly for a vehicle includes a support substrate adapted for rigid attachment within an interior of the vehicle, a haptic touch panel, at least one suspension component joining the support substrate and the haptic touch panel, and first and second actuators rigidly mounted to the haptic touch panel to move the haptic touch panel with respect to the support substrate. The haptic touch panel comprises a decorative side facing toward the interior of the vehicle, an opposite side facing toward the support substrate, and a user interface accessible at the decorative side of the panel that receives manual user input. At least one suspension component joins the support substrate with the opposite side of the haptic touch panel, and the suspension component(s) permit movement of the haptic touch panel with respect to the support substrate in at least two directions. The first and second actuators move the haptic touch panel with respect to the support substrate in response to manual user input received by the user interface. The first actuator moves the haptic touch panel in at least one direction when activated, and the second actuator moves the haptic touch panel in at least one direction different from the direction(s) of the first actuator when activated.

In one or more embodiments, the first and second actuators are independently activatable.

In one or more embodiments, the first actuator is a linear actuator and the second actuator is a rotational actuator.

In one or more embodiments, at least one of the actuators is a piezoelectric actuator.

In one or more embodiments, at least one of the actuators moves the haptic touch panel in a transverse direction.

In one or more embodiments, each suspension component is a molded-in component of the support substrate.

In one or more embodiments, the haptic touch panel further comprises an outer decorative trim piece at the decorative side of the panel. The decorative trim piece comprises an area that is at least partially transparent to visible light. The haptic touch panel further comprises a light source located between the support substrate and the outer decorative trim piece.

In one or more embodiments, the haptic touch panel further comprises a printed circuit board at the opposite side of the panel, wherein the light source is mounted to the printed circuit board. The haptic touch panel further comprises a light guide located between the printed circuit board and a decorative trim piece. The light guide is shaped to direct light from the light source to an area of the trim piece that is at least partially transparent to visible light. The light guide is also shaped to prevent light from the light source from reaching other areas of the trim piece.

In one or more embodiments, the support substrate further comprises at least a portion of a light guide that directs light from a light source to an area at the decorative side of the haptic touch panel that is at least partially transparent to visible light.

In one or more embodiments, the user interface includes a sensor that detects the manual user input and does not move with respect to other components of the haptic touch panel during operation.

In one or more embodiments, the user interface includes a mechanical input device that moves with respect to other components of the haptic touch panel while receiving manual user input.

In one or more embodiments, the actuators and the user interface are in communication with a controller that receives information from the user interface and activates the actuators in one manner when the received information indicates one type of user input and in a different manner when the received information indicates a different type of user input.

In accordance with another embodiment, a haptic touch panel assembly for a vehicle includes a support substrate adapted for rigid attachment within an interior of the vehicle and a haptic touch panel. The haptic touch panel includes a decorative side facing toward the interior of the vehicle, an opposite side facing toward the support substrate, and a user interface accessible at the decorative side of the panel that receives manual user input. The haptic touch panel assembly includes at least one suspension component joining the support substrate with the opposite side of the haptic touch panel, and the at least one suspension component permits at least three degrees of freedom of movement of the haptic touch panel with respect to the support substrate. The haptic touch panel assembly also includes one or more actuators rigidly mounted to the haptic touch panel to move the haptic touch panel with respect to the support substrate in response to manual user input received by the user interface. The actuator(s) move the haptic touch panel in at least two directions when activated.

In one or more embodiments, the one or more actuators includes a first actuator that moves the haptic touch panel in at least one direction when activated, and a second actuator that moves the haptic touch panel in at least one direction different from the direction(s) of the first actuator when activated.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF ILLUSTRATIVE EMBODIMENT(S)

The haptic touch panel assemblies described herein can assist in providing a more dynamic and/or accurate feedback response for a user, particularly in vehicle applications. For instance, haptic feedback can confirm driver input and reduce distractions while driving. Moreover, the haptic touch panel assemblies described below are capable of providing more than a single type of haptic feedback through a combination of different types of actuators, different directions of actuation, different directions of panel movement, and/or multiple degrees of freedom of movement among panel assembly components. FIGS. 1-8 are representative of vehicle haptic touch panel assemblies and different components that may be used for vehicle haptic touch panel assemblies in accordance with various embodiments. It should be noted that the appended drawings are not necessarily to scale.

Figure 1:
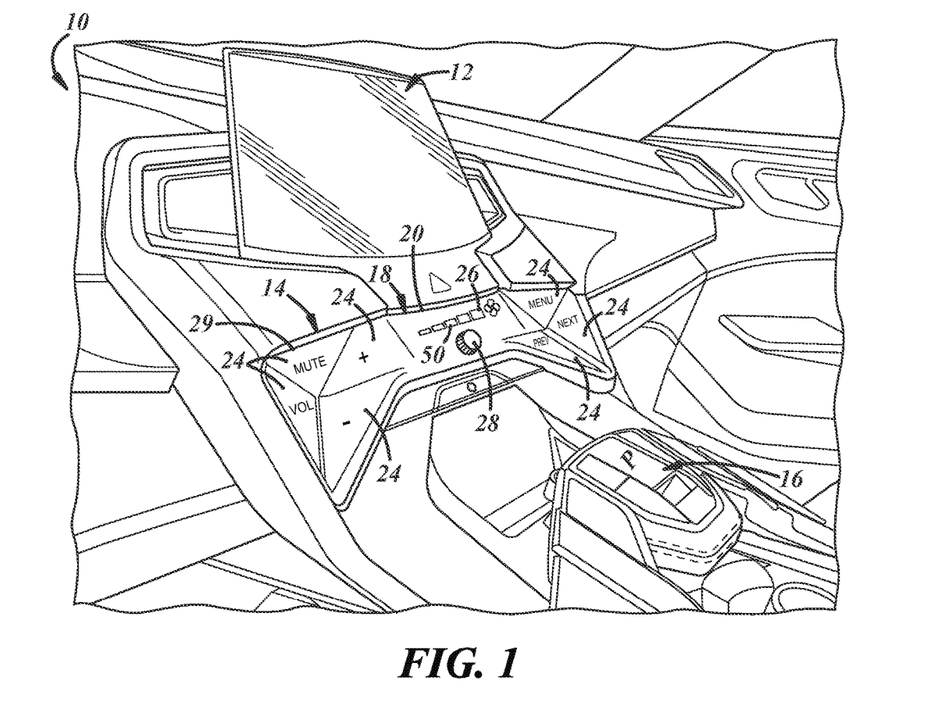
FIG. 1 shows a vehicle interior with various embodiments of haptic touch panel assemblies.

Referring now to FIG. 1, a vehicle interior 10 is shown with various examples of haptic touch panel assemblies including an image display haptic touch panel assembly 12, an interior control haptic touch panel assembly 14, and a gear shifter haptic touch panel assembly 16. The image display panel assembly 12 may provide haptic feedback for users interacting with media menus and features, navigation menus and features, and/or other related menus or features. The interior control panel assembly 14 may provide haptic feedback in response to inputs from a user that adjust various vehicle parameters, including but not limited to, temperature, fan speed, media controls such as volume, menu navigation, etc. The gear shifter panel assembly 16 may provide haptic feedback in response to a change in vehicle gear, for example. In one example, haptic feedback is provided in the transverse x- and/or y-direction (i.e., in line with the surface of the plane of the haptic touch panel) as the driver scrolls through gear choices on a user interface display, and in the axial or z-direction (i.e., normal to the plane of the haptic touch panel) upon selection to confirm the driver's choice of gear.

Haptic feedback may be incorporated in a myriad of other touch panel applications for a vehicle interior. Vehicle components other than those that are part of the instrument panel or driver control center may employ the haptic touch panel assemblies described here, such as steering wheel-mounted controls (e.g., cruise control or radio controls), door-mounted controls (e.g., mirror or window controls), or seat-mounted controls. The term "touch panel" is meant to include any component including a haptic feedback surface, including but not limited to, capacitive or non-capacitive touch screens, touch panels, touch pads, rotary dials, joysticks, etc., with or without a graphical user interface display. While haptic feedback may be particularly useful with touch-sensing controls that would otherwise offer no indication to the user that an input has been received or confirmed, it is also useful with mechanical input devices, particularly in view of the dynamic or high-definition haptic feedback made possible by the teachings presented herein.

The haptic touch panel assembly, such as the interior control haptic touch panel assembly 14 of FIG. 1, may incorporate a wide array of aesthetics and functionality. For example, the haptic touch panel assembly 14 includes a haptic touch panel 18 having a decorative side 20 facing toward the interior of the vehicle 10, as well as a user interface 22 that is accessible at the decorative side of the touch panel 18. The user interface 22 receives manual user input, which is any type of input supplied by a user's hands, whether received by an electronic sensor or a mechanical device. The illustrated user interface 22 includes buttons or button areas 24, a slider 26, and a mechanical input device 28, such as a knob, switch, or dial. Variable and/or different types of haptic feedback may be provided depending on which portion of the user interface 22 the user interacts with. For example, the buttons 24, which may or may not incorporate a standard mechanism used in mechanical push buttons, may trigger a haptic feedback response in the z-direction (i.e., generally normal to the plane of the user interface) when touched, and sliding a finger across the slider 26 may trigger feedback in the x- and/or y-direction (i.e., in line with the surface of the user interface). More complex user inputs and haptic outputs may also be generated. For example, a tangential touch or sliding movement along an edge of the haptic touch panel 18 may trigger a haptic response along the edge of the touch panel that is different from the haptic response provided when the user input is received at one of the buttons 24, for example, so the user is informed regarding what type of input he or she has provided to the panel assembly. The illustrated user interface 22 is merely one example, and any quantity, combination, or arrangement of buttons, sliders, mechanical switches and dials, or any other mechanism for user input may be included.

Figure 2:
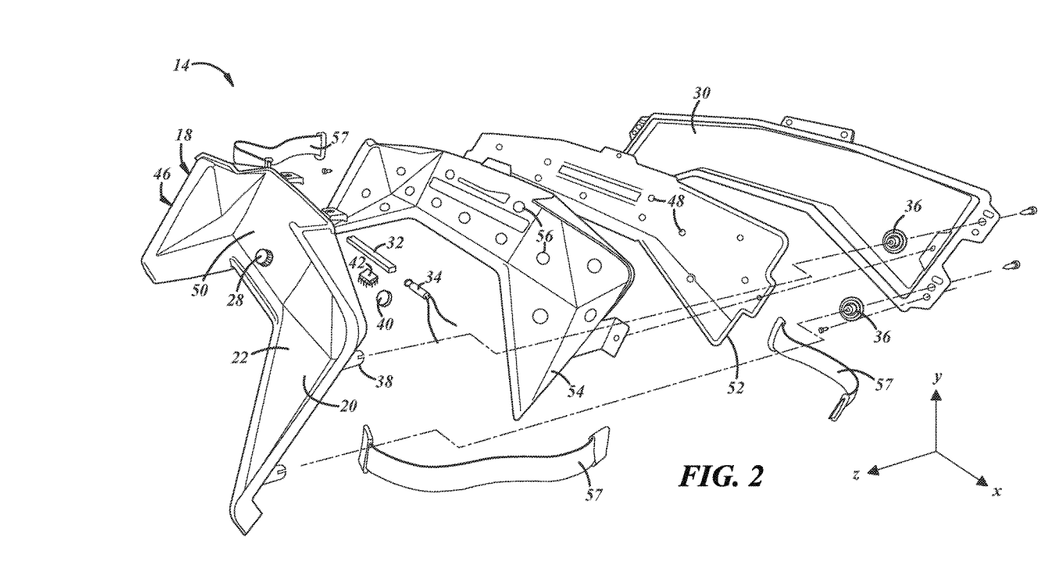
FIG. 2 is an exploded view of an embodiment of one of the haptic touch panel assemblies of FIG. 1.
Figure 3:
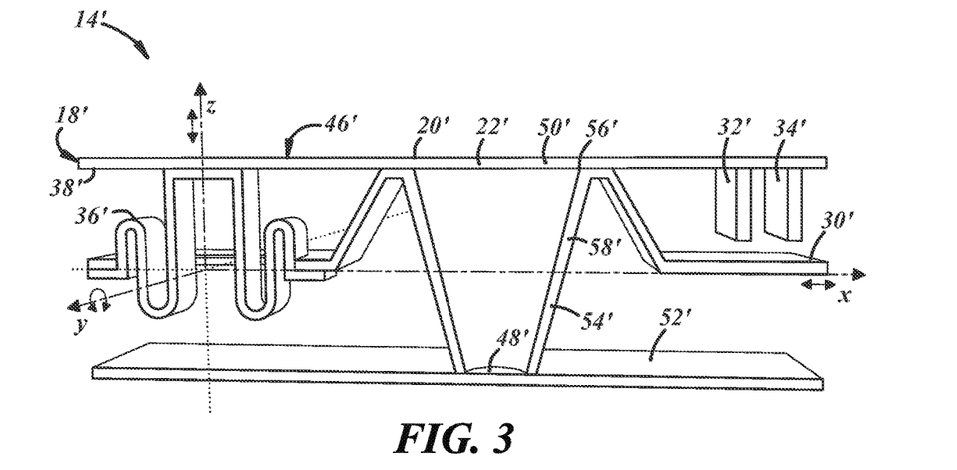
FIG. 3 is a schematic, cross-sectional view of a haptic touch panel assembly in accordance with another embodiment.
Figure 4:
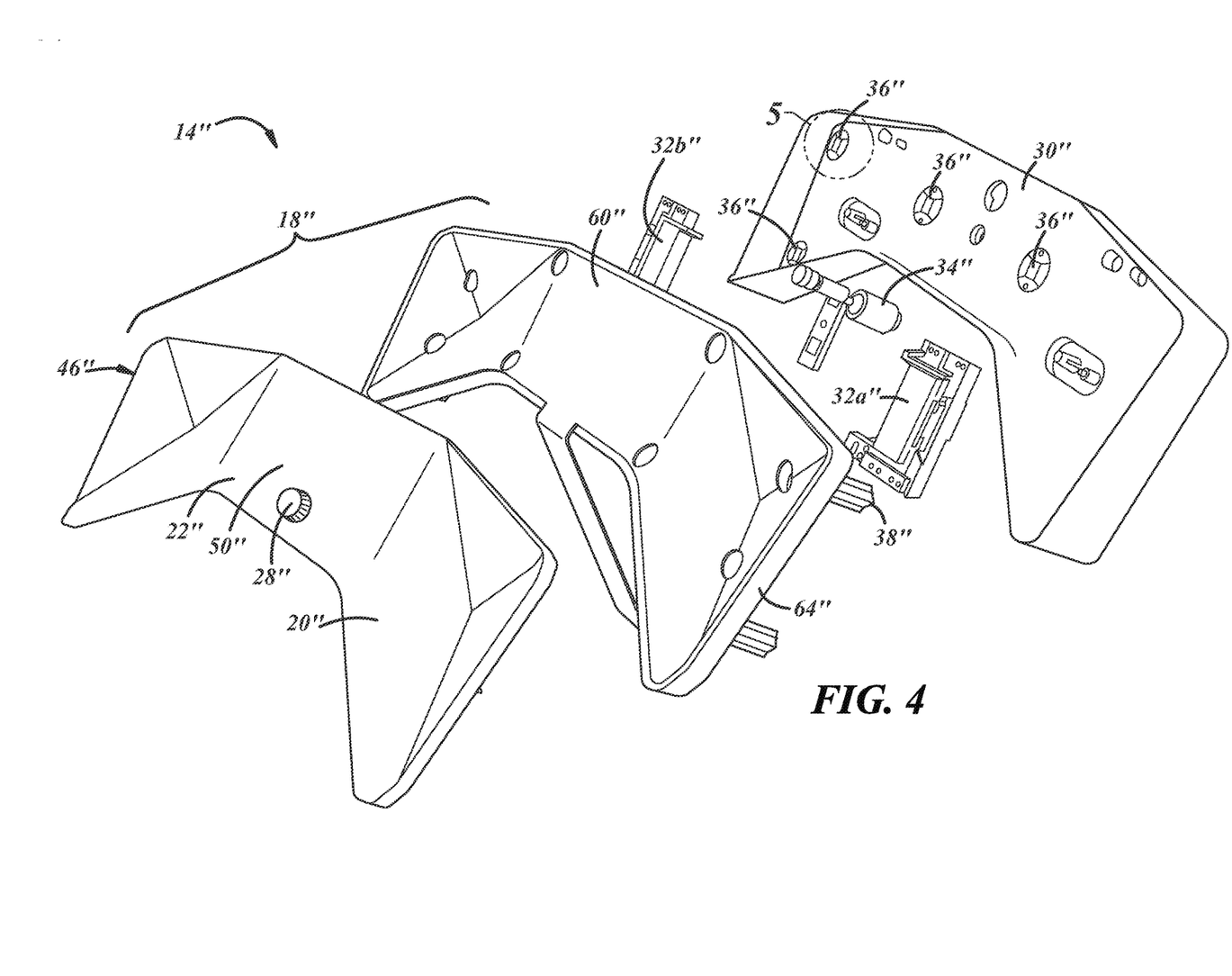
FIG. 4 is an exploded view of a haptic touch panel assembly for a vehicle in accordance with another embodiment.

The following description is provided with relation to the interior control haptic touch panel assembly 14 of FIG. 1 but is equally applicable to any other haptic touch panel assembly, such as the image display assembly 12 or the gear shifter assembly 16, to cite a few particular possibilities. FIGS. 2-4 represent different embodiments of the haptic touch panel assembly 14. Each haptic touch panel assembly includes a haptic touch panel 18, a support substrate 30, a first haptic actuator 32 attached to the touch panel, a second haptic actuator 34 attached to the touch panel, and at least one suspension component 36 that couples the touch panel and the substrate in a manner that permits multiple degrees of freedom of relative movement. The touch panel assembly 14 may include other components not shown in FIGS. 2-4, such as various fixture elements, gaskets and/or dust seals, guiding or locating elements, haptic feedback isolators (e.g. foam pieces), a power source, sensors, buttons, processors, microcontrollers, drivers, software, and/or communication devices to cite a few possibilities. Other haptic touch panel assembly components, arrangements, and architectures are certainly possible.

Referring to the exploded view of the embodiment of the touch panel assembly 14 shown in FIG. 2, the haptic touch panel 18 includes a decorative or front side 20 facing toward the interior of the vehicle and an opposite or back side 38 facing toward the support substrate 30. The user interface 22 is provided at the decorative side of the panel 18. The user interface may 22 include a graphical user interface that includes a display, or the user interface may simply be a generic vehicle interior surface, to name a few possibilities. The user interface 22 may include mechanical input devices such as a knob 28 that moves (e.g., rotates) with respect to other components of the haptic touch panel 18 while receiving manual user input. Other mechanical input devices may include switches, buttons, sliders, rotary dials, joysticks, etc. The user interface 22 may further include one or more sensors 40 that detect manual user input and one or more controllers 42 that receives information from the user interface 22, via the sensor 40 for example, and activates the actuators 32, 34.

Depending on the design of the haptic touch panel assembly 14, the sensors 40 may be of any kind, including but not limited to capacitive, resistive, infrared, and/or surface acoustic wave (SAW) touch sensors. According to one embodiment, the sensor 40 does not move with respect to other components of the haptic touch panel during operation. For example, the sensor 40 may be rigidly mounted as part of the haptic touch panel 18 and does not include moving parts like mechanical input devices. The sensor 40 may be in communication with one or more controllers 42. In one embodiment, the controller 42 may be configured to apply appropriate algorithms or programs in response to user interface input and send, activate, or otherwise transmit a signal to the actuators 32, 34. This transmittance may be direct, or it may be indirect such as through one or more transducers, for example. In another embodiment, the controller 42 may consult one or more look-up tables to determine whether and how to activate a particular actuator. In accordance with one embodiment, the controller 42 receives information from the user interface 22 and activates the actuators 32, 34 in one manner when the information indicates one type of user input, and in a different manner when the received information indicates different type of user input. For example, the controller may receive information from the user interface 22 indicating a sliding touch by a user and, in response, activate one or more of the actuators to trigger haptic feedback along the surface of the user interface to simulate the user's input. If instead, the controller receives information from the user interface indicating a push, such as when a button is pressed or even along the same region of the user interface at which the sliding movement was detected, the controller may activate one or more of the actuators to trigger haptic feedback normal to the plane of the user interface and/or at a single location along the user interface. Other types of input and methods or styles of actuation are certainly possible.

In the embodiment of FIG. 2, the haptic touch panel assembly 14 includes an outer decorative trim piece 46 and at least one light source 48. The outer decorative trim piece 46 and the haptic touch panel 18 are one and the same in this particular example, and the trim piece 46 thus provides the decorative side 20 of the panel 18. The trim piece 46 also includes the user interface 22 in this example. The decorative trim piece 46 comprises an area 50 that is at least partially transparent to visible light. For example, as shown in FIG. 1, the transparent area may be in the form of an icon or other indicia that is illuminated at the decorative side 20 of the panel 18 when the light source 48 is activated. The decorative trim piece 46 may be made from any suitable material, such as plastic, natural-fiber composite, or carbon fiber, to name a few. Furthermore, the decorative trim piece 46 may be in laminate form and include multiple layers. The decorative trim piece may 46 be formed by any number of suitable methods, including injection molding, and more particularly, film insert molding.

The light source 48 may take a variety of forms, such as an LED, a light bulb, or a fiber optic that pipes light from an external source. In this example, the haptic touch panel assembly includes a printed circuit board (PCB) 52, and a plurality of individual LED light sources 48 are mounted to the PCB. Each light source 48 is located between the support substrate 30 and the outer decorative trim piece 46 and illuminates a corresponding area 50 of the trim piece 46. In the example of FIG. 2, the PCB 52 with LEDs 48 is rigidly mounted to the support substrate 30 and does not vibrate or move together with the decorative trim piece 46 during a haptic feedback event. The PCB 52 may provide additional functionality, such as supporting electronic components other than the LEDs (e.g., the controller 42 and/or circuitry that directly or indirectly connects the user interface 22 to vehicle HVAC or other systems). One or more wire harnesses 57 may be provided to electrically interconnect various components of the panel assembly 14 and/or to interconnect the panel assembly 14 with other vehicle components.

The panel assembly 14 of FIG. 2 also includes a light guide 54 located between the PCB 52 and the decorative trim piece 46. The light guide 54 is shaped to direct light from the light source(s) 48 to the illuminated area 50 of the trim piece 46, while preventing the light from reaching other areas of the trim piece 46. The light guide 54 thus functions to isolate and direct light from each individual LED 48 to a dedicated area of the decorative trim piece. In the example of FIG. 2, the light guide 54 is a panel with a series of apertures 56 formed therethrough. Each of the apertures 56 is located along the light guide 54 to correspond to the location of one of the LEDs 48 and the corresponding dedicated area 50 of the trim piece 46. A tube or channel (not shown in FIG. 2) may extend from the back side of the light guide 54 to the PCB 52 at each aperture to direct light from each light source 48 to the desired area 50 of the trim piece 46. In this example the light guide 54 is rigidly mounted to the substrate 30 together with the PCB 52 such that the light guide does not vibrate or move together with the decorative trim piece 46 during a haptic feedback event.

The support substrate 30 is adapted for rigid attachment within an interior of the vehicle, such as the vehicle interior 10 shown in FIG. 1. More particularly, the substrate 30 is intended to be rigidly mounted to the vehicle so that it remains stationary with respect to the vehicle body during a haptic feedback event. The haptic touch panel 18 moves in relation to the support substrate 30 to provide the haptic feedback response, and activation of the haptic actuators 32, 34 initiates touch panel movement. In some cases, the support substrate 30 is configured to move (e.g., a compartment door), but it is generally intended to be the non-moving component of the panel assembly 14 relative to which the panel 18 vibrates or otherwise moves in response to activation of the actuators 32, 34 to provide the haptic feedback.

One or more suspension components 36 join the haptic touch panel 18 to the substrate 30 in a manner that allows the panel 18 to move with respect to the support substrate 30 with multiple degrees of freedom. Each degree of freedom (DOF) is either translational or rotational. For example, the suspension components 36 may be configured with two degrees of freedom, such as permitting translational movement in both the x- and y-directions or permitting rotational movement in one plane and translational movement in the direction of the x-, y-, or z-axis. Preferably, the suspension components 36 are configured to provide three or more degrees of freedom of movement. Several examples of suspension components suitable for coupling the haptic touch panel 18 to the support substrate 30 are described in detail in U.S. patent application Ser. No. 14/535,747, filed Nov. 7, 2014, the entire contents of which are hereby incorporated by reference in their entirety. The referenced patent application discloses the particular suspension components 36 shown in FIG. 2, which provide five degrees of freedom of movement.

As indicated in FIG. 2, these individually provided suspension components are fixed to the support substrate 30 on one side and to the haptic touch panel 18 on the other side. In this example, fasteners extend through apertures in the substrate 30, through the suspension components 36, and into bosses on the back side 38 of the decorative trim piece. Although not necessary, the support substrate 30 may be cut or otherwise formed to allow for proper placement of the suspension components 36. For example, the support substrate may be formed with holes, gaps, or other locating features to facilitate placement and/or attachment of the suspension components. This embodiment may be beneficial in a scenario in which the support substrate 30 is already formed and/or installed in a vehicle, and the vehicle interior is being retrofitted with a haptic touch panel assembly.

In operation, the haptic feedback is facilitated by one or more haptic actuators, such as first and/or second haptic actuators 32, 34. Each actuator 32, 34 may be a rotational actuator or a linear actuator. An exemplary rotational actuator is an eccentric rotating mass (ERM) actuator. ERM actuators are inexpensive, have a strong resonant frequency, and have simpler electronic schemes than other actuators. Examples of linear actuators include a linear resonant actuator (LRA), a linear solenoid, a piezoelectric actuator, an electrically active polymer (EAP), or the like. One benefit of LRAs is that they are inexpensive. Linear solenoids are able to move large masses and are accordingly capable of large displacement. Linear solenoids also have a fast start up time (e.g., less than 5 ms). Piezoelectric actuators may use one or more piezoceramic layers, and they are desirable for use in haptic touch panel assemblies for vehicles because they have a very fast response time (e.g., less than 5 ms). Piezoelectric actuators are not bound by frequency or amplitude and can produce high end and complex waveform profiles. An EAP typically changes shape/size when current is applied, usually through elongation, and has a fast start-up time (e.g., less than 5 ms).

The haptic touch panel assembly 14 may include two haptic actuators or more than two haptic actuators, and may also include foam, spacers, or other components to isolate haptic feedback in particular locations. Moreover, it is possible to use different types of actuators in the same haptic touch panel assembly to provide varying types of haptic feedback. In one embodiment, the first and second actuators are independently activatable, such that a controller can activate them separately as desired. For example, the panel assembly may be configured with a controller such that user input via the slider 26 of FIG. 1 results in haptic feedback that follows the user's finger via sequential activation of a series of actuators.

In accordance with another embodiment, the first actuator 32 is a linear actuator and the second actuator 34 is a rotational actuator. For example, the second actuator 34 may be an ERM actuator. An ERM actuator can provide planar movement in more than one radial direction with respect to the axis of rotation of the eccentric mass. With properly configured suspension components 36, such an actuator can provide movement of the panel 18 in the x- and y-directions if oriented with its rotational axis in the z-direction. The first linear actuator 32 can be oriented to provide movement in the z-direction to provide movement in all three axes with two actuators. Or the first actuator could be oriented to provide movement in the x- or y-direction. In that case, different types of haptic feedback are produced depending on which actuators are activated. Activation of the linear actuator alone produces unidirectional haptic feedback. Activation of the rotational actuator alone produces multi-directional, planar haptic feedback. And activation of both actuators together produces multi-directional, planar haptic feedback which is stronger in one direction of the plane. The linear and rotational actuators could be sequentially activated, or the first actuator could be initially activated with the second actuator being activated before the first actuator stops moving. The axis of rotation of the rotational actuator may be otherwise oriented—e.g., in the direction of the x- or y-axis or in an off-axis direction. Multiple rotational actuators with their respective rotational axes oriented in different directions and/or multiple linear actuators with their axes oriented in different directions may be employed. The possible combinations of different types of haptic feedback are nearly endless.

Another example of a suitable combination of haptic actuators includes a first linear actuator that provides touch panel movement in one direction (e.g., the X direction) and a second linear actuator that provides touch panel movement in another direction (e.g., the Y direction). Another example of a suitable combination of actuators includes a first and second rotational actuators, oriented with their rotational axes in the same or different directions. It is also possible to benefit from suspension components configured to allow multiple degrees of freedom with a single actuator. For example, a rotational actuator can provide movement of the haptic touch panel in more than one direction, typically transverse to the axis of rotation, and can be combined with multiple DOF suspension components to achieve complex and/or varying types of haptic feedback. In one particular example, a rotational actuator can be mounted to the haptic touch panel with the rotational axis in an off-axis orientation with respect to the touch panel resulting in movement in all three directions (i.e., x-, y-, and z-directions). It is also contemplated that a single actuator may provide three or more directions of actuation and that a single linear actuator may provide more than one direction of actuation. For example, actuators may be or may become commercially available in which multiple linear and/or rotational actuators are combined into an individual unit and can be mounted to the haptic touch panel. In other examples, a single piezoelectric actuator may have a non-beam shape and result in more than one direction of movement, or a piezoelectric actuator may include multiple layers with different shapes, sizes, and/or orientations.

The haptic actuators may produce touch panel movement with a variety of different waveform profiles. Various types, quantities, and arrangements of haptic actuators can be combined with the multiple degrees of freedom (DOF) provided by the suspension components 36 to generate a large variety of different haptic feedback responses. In another embodiment, at least one of the actuators 32, 34 is a piezoelectric actuator. In one particular example, a linear solenoid may be used to provide haptic feedback in the z-direction by actuating in a direction normal to the surface of the touch panel, while a piezoelectric actuator may be used to provide haptic feedback in the x-direction or y-direction by actuating in a direction in line with the surface of the touch panel. When combined, a piezoelectric actuator and a linear solenoid synergistically provide haptic feedback with the benefits of both types of actuators—i.e., the fast response and controllability of the piezo actuator, and the large displacement capability of the solenoid.

In another embodiment, at least one of the actuators move the haptic touch panel in the transverse direction. It has been found that actuation in directions other than the axial or z-direction (i.e. normal to the haptic surface) can be advantageous due to the damping effect in the z-direction of the user touching the interface.

FIG. 3 is a cross-sectional view of a portion of another embodiment of the haptic touch panel assembly 14'. In this example, as with the example of FIG. 2, the PCB 52' and the light guide 54' are rigidly mounted together as stationary components with respect to the haptic touch panel 18', which is here again one and the same with the decorative trim piece 46'. In this case, the light guide 54' may be considered to be at least a portion of the support substrate 30'. In this view, a conical tube or channel 58' extending from the aperture 56' of the light guide 54' to the PCB 52' is shown, along with the location of a light source 48' from which light is directed to the dedicated and at least partially transparent area 50' of the decorative trim piece 46'.

The suspension component 36' of FIG. 3 is also disclosed and described in greater detail in the aforementioned U.S. patent application incorporated by reference herein. This particular suspension component provides three degrees of freedom as shown: along the X axis, rotationally around the Y axis, and along the Z axis. While FIG. 3 shows the suspension component 36' in direct contact with the touch panel 18', it should be understood that various spacers or other components may be included to facilitate an indirect attachment of the suspension component and the touch panel. Any suitable attachment means may be used to attach the touch panel and the suspension component, including adhesive, welds, or mechanical fasteners such as screws, nuts, bolts, etc., to name a few possibilities.

FIG. 4 is an exploded view of another embodiment of the haptic touch panel assembly 14". In this example, the PCB and light guide of the embodiments of FIGS. 1-3 is eliminated and replaced with a contoured circuit layer 60". The contoured circuit layer 60" generally includes a flexible polymer material with foil or other electrical conductors embedded in, printed on, or laminated with the polymer. Such electrical conductors perform the function of the electrical lead on a traditional PCB, but as part of the contoured circuit layer 60", they can be shaped to follow the contours of mating components, such as the decorative trim piece 46". The contoured circuit layer 60" may include LEDs as light sources (not shown), such as printed thin-layer LEDs or surface mounted LEDs. In one embodiment, the contoured circuit layer 60" is insert-molded as a film onto a carrier 64". The contoured circuit layer 60" is shaped complimentary to an inner surface of the decorative trim piece 46". Other components of the haptic touch panel assembly 14" may be integrated with the contoured circuit layer 60", such as sensors and controllers. Forming the contoured circuit layer may involve any number of processes, including but not limited to, flexible circuit printing, surface mounting of electronic components, thermoforming, in-mold labeling, and injection molding.

This configuration allows the light source, where provided, to be in direct or nearly direct contact with the back side of the decorative trim piece and the corresponding area 50" to be illuminated, eliminating the need for a light guide. The need for a PCB is also eliminated since the desired circuitry can be included in the contoured circuit layer 60". As a result, the overall thickness of the panel assembly 14" can be reduced compared to the previously described embodiments. For example, with reference to FIG. 3, elimination of the light guide 54' and the associated tube(s) 58' allows the PCB 52' to be packaged closer to the decorative trim part, and further elimination of the PCB 52' allows for an even smaller package size with an overall thickness approximately half the thickness of more conventional panel assemblies, or less. In addition, as shown in FIG. 4, the relatively low mass of the circuit layer 60" allows the circuit layer and light source to be part of the moving mass of the haptic touch panel 18". In other words, the illustrated haptic touch panel 18" can include the decorative trim piece 46" and all of the circuitry and light sources integrated together as one piece that moves with respect to the rigidly mounted substrate 30" to provide the haptic feedback. The reduced mass has benefits related to haptic feedback, such as the ease with which the moving mass can be moved, leading to faster response times and facilitating the use of smaller actuators. The carrier 64" provides the back or opposite side 38" of the haptic touch panel 18" in this case, and the haptic actuators 32", 34a", and 34b" are mounted to the back side of the panel 18".

In the embodiment of FIG. 4, the suspension components 36" are integrally formed as part of the support substrate 30" via injection molding, for example. This embodiment may be beneficial in a scenario in which a fully formed haptic touch panel assembly for a vehicle is to be provided. An enlarged view of a molded-in suspension component 36" is provided in FIG. 5. The particularly illustrated suspension component 36" provides five DOF movement, as described in the aforementioned patent application incorporated by reference above.

Figure 6:
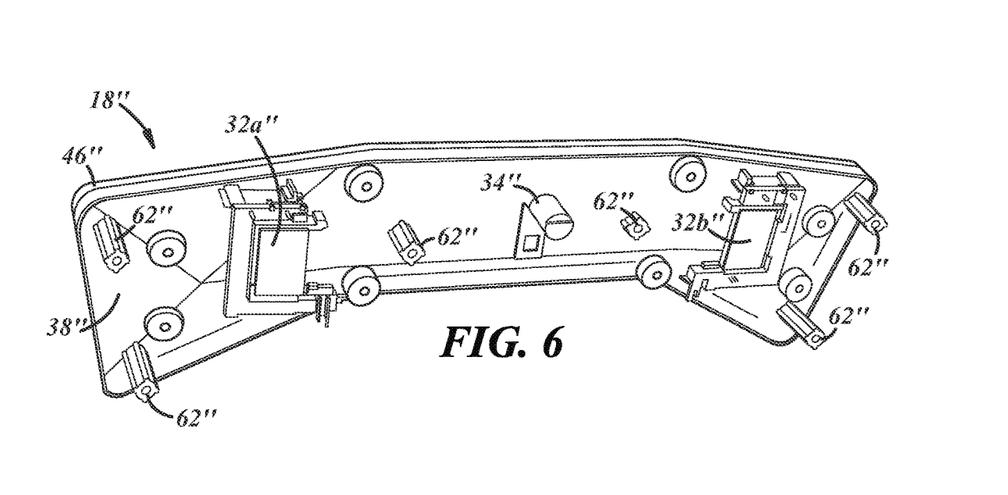
FIG. 6 shows a plurality of actuators attached at a back side of an illustrative haptic touch panel.

Referring now to FIG. 6, the back side 38" of the touch panel 18" of FIG. 4 is shown. In this embodiment, the panel 18" includes two linear actuators 32a", 32b" and a rotational actuator 34". In a particular embodiment, the linear actuators are solenoid actuators and the rotational actuator is an ERM actuator. Suspension adapters 62" are also included and may be used to help facilitate attachment of the integrated suspension components 36".

Figure 5:
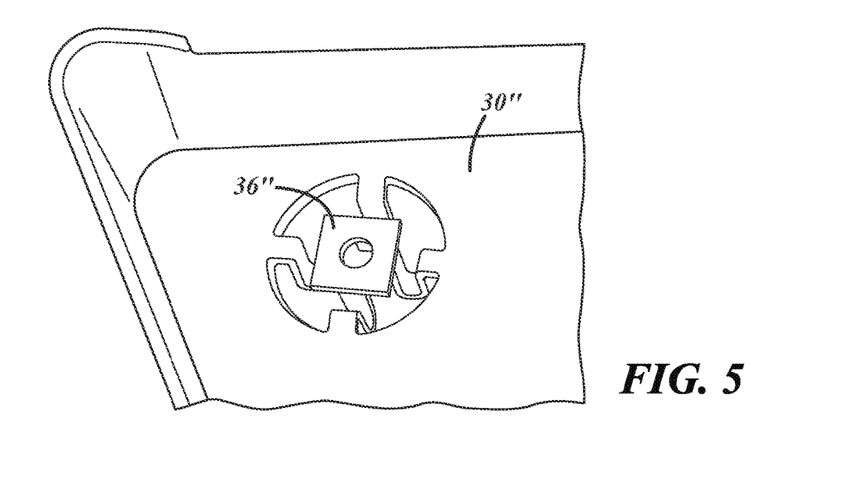
FIG. 5 is an enlarged view of one example of a suspension component molded into the support substrate of the haptic touch panel assembly of FIG. 4.
Figure 7:
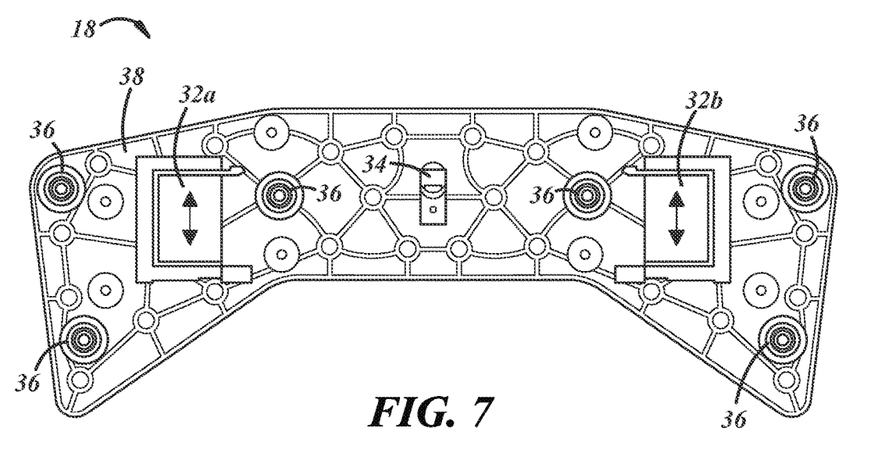
FIGS. 7 and 8 show examples of different arrangements of suspension components and haptic actuators.
Figure 8:
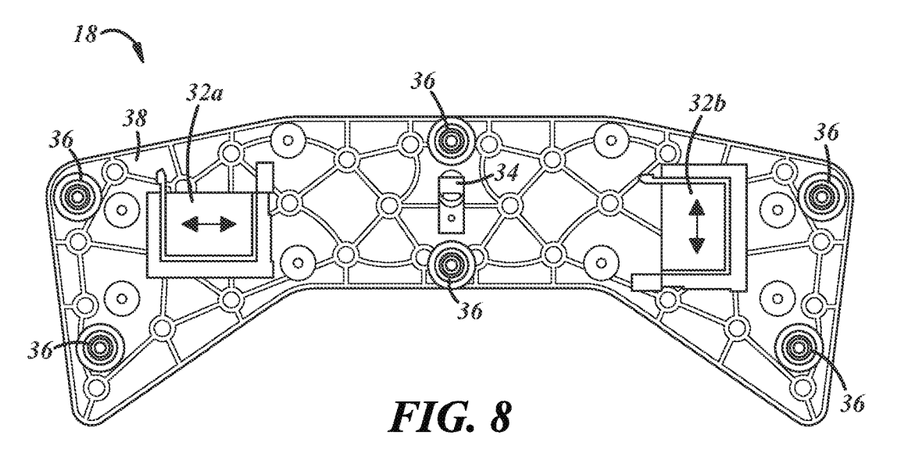

FIGS. 7 and 8 are views of the back sides of two different haptic touch panels 18 similar to that of FIGS. 4-6 with attached actuators 32, 34a,34b, where the suspension components and the actuators are illustrated in two different configurations. The embodiment of FIG. 7 includes two linear actuators 32a,32b mounted to the haptic touch panel 18 in the same orientation, each providing touch panel movement in the same direction (i.e., the Y direction), along with a rotational actuator 34. The embodiment of FIG. 8 includes the same two linear actuators 32a,32b and rotational actuator 34, but one of the linear actuators 32a is mounted to the haptic touch panel 18 in a different orientation from the other linear actuator 32b. In this example, one linear actuator 32a provides touch panel movement in the X direction, and the other linear actuator 32b provides touch panel movement in the Y direction. In operation, when haptic feedback including touch panel movement only one X or Y direction is desired, the corresponding actuator 32a,32b can be activated. Both actuators 32a,32b (and/or the rotational actuator 34 if mounted appropriately) can be simultaneously activated for haptic feedback is desired that includes touch panel movement in both X and Y directions. The rotational actuator may be omitted in another example.

FIGS. 7 and 8 also show the suspension components 36 in different locations. In particular, the two of the suspension components located inboard of the linear actuators are horizontally spaced and aligned in FIG. 7, and vertically spaced and aligned in FIG. 8. CAE analysis indicates a shift in vibrational modal frequencies with this change in suspension component location, even when the actuator directions and locations are unchanged, illustrating another way to alter the haptic feedback responses available from the haptic touch panel assembly using the same combination of actuators at the same locations.

As evidenced by the appended drawings and accompanying descriptions, the haptic touch panel assembly may take numerous forms. The desired haptic feedback response may be altered by changing the various structural features and arrangements taught herein. A skilled artisan in possession of these teachings will now be able to tune a multiple DOF haptic touch panel assembly and take advantage of a nearly endless variety of different haptic feedback responses to effectively communication information to the user about the provided inputs—e.g., a different type of haptic feedback can be provided to correspond with different types of user inputs.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A haptic touch panel assembly for a vehicle, comprising:
   a support substrate adapted for rigid attachment within an interior of the vehicle;
   a haptic touch panel comprising a decorative side facing toward the interior of the vehicle, an opposite side facing toward the support substrate, and a user interface accessible at the decorative side of the panel that receives manual user input;
   at least one suspension component joining the support substrate with the opposite side of the haptic touch panel, wherein each suspension component permits at least two directions of movement of the haptic touch panel with respect to the support substrate;
   first and second actuators rigidly mounted to the haptic touch panel to move the haptic touch panel with respect to the support substrate in response to manual user input received by the user interface, wherein the first actuator moves the haptic touch panel in at least one direction when activated, and the second actuator moves the haptic touch panel in at least one direction different from the direction(s) of the first actuator when activated;
   a printed circuit board;
   a light source mounted to the printed circuit board; and
   a light guide located between the printed circuit board and the haptic touch panel and shaped to direct light from the light source to an area of the haptic touch panel that is at least partially transparent to visible light and to prevent light from the light source from reaching other areas of the haptic touch panel,
   wherein the printed circuit board and the light guide are rigidly mounted to the support substrate so that the haptic touch panel moves with respect to the printed circuit board and the light guide when one or more of the actuators are activated.

2. A haptic touch panel assembly as defined in claim 1, wherein the first and second actuators are independently activatable.

3. A haptic touch panel assembly as defined in claim 1, wherein the first actuator is a linear actuator and the second actuator is a rotational actuator.

4. A haptic touch panel assembly as defined in claim 1, wherein at least one of the actuators is a piezoelectric actuator.

5. A haptic touch panel assembly as defined in claim 1, wherein at least one of the actuators moves the haptic touch panel in a transverse direction.

6. A haptic touch panel assembly as defined in claim 1, wherein at least one suspension component is a molded-in component of the support substrate.

7. A haptic touch panel assembly as defined in claim 1, wherein the haptic touch panel further comprises:
   an outer decorative trim piece at the decorative side of the panel, the decorative trim piece comprising the area that is at least partially transparent to visible light,
   wherein the light source is located between the support substrate and the outer decorative trim piece and illuminates said area of the decorative trim piece.

8. A haptic touch panel assembly as defined in claim 1, wherein the user interface includes a sensor that detects the manual user input and does not move with respect to the decorative or opposite sides of the haptic touch panel during operation.

9. A haptic touch panel assembly as defined in claim 1, wherein the user interface includes a mechanical input device that moves with respect to the decorative or opposite sides of the haptic touch panel while receiving manual user input.

10. A haptic touch panel assembly as defined in claim 1, wherein the actuators and the user interface are in communication with a controller that receives information from the user interface and activates the actuators in one manner when the received information indicates one type of user input and in a different manner when the received information indicates a different type of user input.

11. A haptic touch panel assembly for a vehicle, comprising:
- a support substrate adapted for rigid attachment within an interior of the vehicle;
- a haptic touch panel comprising a decorative side facing toward the interior of the vehicle, an opposite side facing toward the support substrate, and a user interface accessible at the decorative side of the panel that receives manual user input;
- at least one suspension component joining the support substrate with the opposite side of the haptic touch panel, wherein the at least one suspension component permits at least three directions of movement of the haptic touch panel with respect to the support substrate;
- one or more actuators rigidly mounted to the haptic touch panel to move the haptic touch panel with respect to the support substrate in response to manual user input received by the user interface, wherein the actuator(s) move the haptic touch panel in at least two directions when activated;
- a printed circuit board;
- a light source mounted to the printed circuit board; and
- a light guide located between the printed circuit board and the haptic touch panel and shaped to direct light from the light source to an area of the haptic touch panel that is at least partially transparent to visible light and to prevent light from the light source from reaching other areas of the haptic touch panel,
- wherein the printed circuit board and the light guide are rigidly mounted to the support substrate so that the haptic touch panel moves with respect to the printed circuit board and the light guide when one or more of the actuators are activated.

12. A haptic touch panel assembly as defined in claim 11, wherein the one or more actuators includes a first actuator that moves the haptic touch panel in at least one direction when activated, and a second actuator that moves the haptic touch panel in at least one direction different from the direction(s) of the first actuator when activated.

13. A haptic touch panel assembly as defined in claim 11, wherein each of the one or more actuators is independently activatable.

14. A haptic touch panel assembly as defined in claim 11, wherein the one or more actuators includes a linear actuator and a rotational actuator.

15. A haptic touch panel assembly as defined in claim 11, wherein at least one of the actuators is a piezoelectric actuator.

16. A haptic touch panel assembly as defined in claim 11, wherein at least one suspension component is a molded-in component of the support substrate.

17. A haptic touch panel assembly as defined in claim 11, wherein the haptic touch panel further comprises:
- an outer decorative trim piece at the decorative side of the panel, the decorative trim piece comprising the area that is at least partially transparent to visible light,
- wherein the light source is located between the support substrate and the outer decorative trim piece and illuminates said area of the decorative trim piece.

18. A haptic touch panel assembly as defined in claim 11, wherein the user interface includes a sensor that detects the manual user input and does not move with respect to the decorative or opposite sides of the haptic touch panel during operation.

19. A haptic touch panel assembly as defined in claim 11, wherein the user interface includes a mechanical input device that moves with respect to the decorative or opposite sides of the haptic touch panel while receiving manual user input.

20. A haptic touch panel assembly as defined in claim 11, wherein the one or more actuators and the user interface are in communication with a controller that receives information from the user interface and activates the one or more actuators in one manner when the received information indicates one type of user input and in a different manner when the received information indicates a different type of user input.

* * * * *